United States Patent Office 2,733,221
Patented Jan. 31, 1956

2,733,221

EXPANDED RESIN AND METHOD FOR MAKING THE SAME

Steven P. Kish, Lansing, and Lester C. Coe, deceased, late of Lansing, Mich., by Milton L. Coe, administrator, Delhi Township, Ingham County, Mich., assignors to Kish Plastic Products, Inc., Lansing, Mich., a corporation of Michigan No Drawing. Application December 19, 1951, Serial No. 262,478

6 Claims. (Cl. 260—2.5)

This invention relates broadly to resinous compositions and more particularly to improved infusible water insoluble expanded cellular resins of the thermosetting type and to a process of preparing the same.

The product of this invention is useful in such applications as wall board, sound insulation board, furniture and door manufacture, reproduction tools and fixtures of the type conventionally employed by the automotive industry in connection with body design and fabrication, and mannequin figures for advertising.

Expanded plastics such as phenolics, ureas, vinyls, alkyds and rubber have heretofore been developed, and a variety of methods have been proposed to expand these materials including mechanical agitation, use of mechanical blowing agents, use of gases dissolved under pressure and subsequently released, and use of insoluble solids which are incorporated with the plastic and subsequently leached out. The properties of expanded materials heretofore produced have been widely variant, but to our knowledge none of the proposed materials combine the properties of high mechanical strength, high impact and compressive strengths, water insolubility, controllable density and infusibility.

We have now devised a novel method of expanding partially polymerized liquid, thermosetting, resinous materials. Broadly, the method of this invention comprises the steps of incorporating at least one metal above hydrogen in the electromotive series, together with an acid or acid solution, into a partially polymerized liquid resin and then thoroughly mixing or otherwise agitating the mass to distribute the additives uniformly throughout the resin. Hydrogen and possibly other gaseous substances produced in the resin mass by reaction of the metal with the acid causes the resin to expand. The resin is set or hardened as it expands and the end product is a hard, lightweight, cellular material of great commercial value. Expanded resinous materials formed by this process are characterized by improved uniformity of porosity, high mechanical impact and compressive strengths. The density of the product is controllable as will be hereinafter more fully discussed.

It is one of the objects of the present invention to provided an expanded cellular resin of the thermosetting type.

A further object of the invention is to provide a phenol-aldehyde type expanded resin which is infusible, water insoluble, fungus-resistant, low in density, high in compressive and impact strengths, resilient and substantially non-toxic.

Another object of this invention is to provide a method of making improved expanded resins of the thermosetting type.

Other objects and advantages of the novelty will become apparent as the description proceeds.

A wide variety of resins of the thermosetting type may be used in producing the products of this invention including the phenolics, ureas, melamines and polyesters. The resin which is selected for any particular application will, of course, depend upon the specific requirements of the application, but the benefits of this invention can be obtained with any thermosetting resin in liquid form having sufficient liquidity to enable the uniform admixture with the gas-producing materials. The phenol-aldehyde thermosetting acid-curing resins are preferred and typical examples of such resins are phenol-formaldehyde resins, phenol-formaldehyde urea resins, phenol-formaldehyde melamine resins, phenol-formaldehyde polyvinyl formal resins, and phenol-formaldehyde polyvinyl alcohol resins.

Phenol-aldehyde type resins obtained by the use of either strong or mild alkaline, inorganic or organic catalysts may be employed to advantage. Phenol-formaldehyde reaction products produced in the presence of mild inorganic or organic catalysts appear to possess superior characteristics for some purposes to those produced in the presence of strong alkaline catalysts. In general, resinous reaction products which are substantially neutral; that is, having a pH between about 7 and about 9, may be used and resins having a pH close to 7 are preferred. A typical phenol-aldehyde resinous material may be produced by admixing phenol or phenol obtained from related raw materials such as cresol, xylenol or mixtures thereof with formaldehyde in a mol ratio of approximately 1:1 to 1:1½. To this mixture in a reaction kettle, the desired quantity of alkaline catalyst is added, and the ingredients are thoroughly mixed at room temperature or slightly above. The temperature of the mixture is then uniformly increased to approximately 125° F. to 212° F. and preferably to 200° F. and the resin mass is maintained at approximately this temperature for approximately one to two hours to produce a one-stage partially polymerized liquid reaction product. A vacuum is drawn on the reaction kettle for a short time, then released, and the liquid mass is chilled and removed from the kettle. The resultant is a typical, relatively stable, partially polymerized phenol-formaldehyde resin in the form of a relative viscous liquid having a viscosity in the range of 80 to 140 centipoises at 25° C. when diluted in the ratio of 3 parts methyl alcohol to 1 part resin. Such a resin will typically have a specific gravity of about 1.19 to about 1.20 and will contain resin solids between about 75% to about 90% by weight.

As suggested, any metal having an electrode potential greater than hydrogen may be employed in combination with an aqueous acidic solution to expand the partially polymerized resinous material. Of the metals included within this group, the commercially available metals including iron, cobalt, nickel, aluminum, magnesium, zinc, lead, tin, calcium, barium and strontium are most suitable, and exceptionally good results have been obtained with iron, aluminum, and magnesium. The rate of evolution of gaseous reaction products which results when one of the above metals or several of these metals in combination reacts with the aqueous acidic solution in the presence of the partially polymerized liquid resinous material is dependent both upon the proportion of the metal which is present and the concentration and amount of the aqueous acidic solution.

In a broad sense, any aqueous acidic solution which is capable of releasing gaseous products of reaction with a metal above hydrogen in the electromotive series may be used in the process. While it is not desired to be restricted by theoretical reason responsible for the production of the unusually desirable products of this invention, it is believed that the primary constituent of the gaseous reaction of the metal and the aqueous acidic solution is hydrogen. However, as is well known, certain oxygen containing oxidizing acids release gaseous reaction products other than hydrogen upon reacting with a metal; for example, nitric acid is thought to release an oxide of nitrogen as well as hydrogen, and relatively concentrated sulfuric acid is thought to release sulfur dioxide in addition to hydrogen. The inorganic acids, because of their relative cheapness and availability, are preferred for the purposes of this invention; and of these acids, the more active ones such as sulfuric, hydrochloric, nitric and phosphoric acids are particularly suitable. A variety of organic acids also are operative in the process, typical examples of such acids being fatty acids, acrylic acids, acetylene acids, monocarboxylic aromatic acids, dicarboxylic acids such as oxalic acids, fumaric acids and dicarboxylic aromatic acids. Formic, acetic and oxalic acids are preferred representatives of the organic acids.

In general, the method of this invention comprises the steps of admixing a liquid partially polymerized thermosetting resin with at least one metal, preferably in powdered form, having an electrode potential greater than hydrogen and an acidic aqueous solution, the metal and the acidic aqueous solution being present in proportions sufficient to generate a quantity of gaseous reaction products sufficient to produce an expansion of the liquid thermosetting resin. It will be understood that the desired degree of expansion of the resin will be dependent upon the particular application in which the final product is to be used, and that the minimum proportion of metal which must be present in order to obtain the benefits of this invention is only that amount which will release sufficient gaseous reaction products to cause the resin to foam and assume an expanded form. Sufficient acid should be present to completely react with the total amount of metal which is added and in those instances in which the thermosetting resin employed is also an acid-curing resin, the proportion of acid present is preferably an amount in excess of the molecular equivalent required to react with the metal present, the excess being an amount sufficient to cause further polymerization and final curing of the expanded resin to a rigid, set condition. The rate of evolution of gaseous reaction products will be recognized by those skilled in the art to be dependent upon the concentration of acid used and the inherent reaction rate of the particular metal with the acid. For example, it is well known that for any single concentration of aqueous acidic solution the rate of gas evolution resulting from the addition of aluminum or magnesium or calcium thereto is greatly in excess of the rate which results from the addition of iron or zinc or cadmium. It will therefore be appreciated that there is an optimum concentration of acid and an optimum proportion of metal requisite to the production of a controllable or desirable gas evolution rate for a particular liquid resinous composition. For example, it has been found that for a mixture of a phenol-formaldehyde liquid product of the partial reaction of phenol and formaldehyde having a specific gravity of about 1.19 and 75%–78% resin solids by weight and a mineral acid aqueous solution containing about 33% HCl (18° Bé.), 30% $H_2SO_4$ (66° Bé.) and about 5% $H_3PO_4$ (75%) the admixture of less than about 1.2% iron or more than about 12% of iron was undesirable. Proportions of iron below about 1.2% would not produce sufficient gaseous reaction products to expand the resin, whereas proportions above about 12% caused the resin to rise rapidly and thereafter to shrink back upon itself. In the presence of the same concentration of mineral acid, a similar quantity of aluminum was found to react much faster and to evolve gas at a faster and less controllable rate than iron. At this acid concentration approximately one tenth as much aluminum as iron produces comparable rates of gas evolution. Magnesium and calcium release gas at even faster rates than aluminum. In a similar manner it was observed that zinc, cobalt, lead and tin reacted more slowly than iron and that with a corresponding concentration of acid solution somewhat larger proportions of these metals were required to obtain comparable foaming. Mixtures of metals such as iron and aluminum, aluminum and cadmium, aluminum and zinc can be used, and tests have indicated that a large number of workable metallic combinations are available. The gas evolution rate of these combinations can be readily controlled by varying the relative proportions of the rapid and slow reactive metals. As indicated hereinbefore, the quantity of metal and the concentration of the aqueous acidic solution required for specific applications are dependent upon a variety of factors including the size of the batch, whether a cellular resin of high or low density is desired, and the relative viscosity of the thermosetting partially polymerized resinous material. It will be apparent, however, from the above generalizations that substantially any desired degree of porosity may be obtained in the final resin product by one skilled in the art carrying out a few simple tests at operating conditions to determine the optimum proportions required.

The strength of acid employed may vary widely depending upon the exigencies of the particular situation. We have found, for example, that relatively concentrated and relatively strong acids such as glacial acetic acid are operative, that aqueous acidic solutions having an activity rate substantially equal to glacial acetic acid are satisfactory and that a relatively dilute aqueous solution of a strong acid such as 30% concentration of 66° Bé. sulfuric acid can be used. The rate of reaction of aqueous acidic solutions, in general, decreases as the concentration of the solution decreases, and for commercial purposes, concentrations of acids below the equivalent in activity of about 30% 66° Bé. sulfuric acid are too slow to be practicable. In general, with concentrations of acidic solutions equivalent in activity to 50% 66° Bé. sulfuric acid in water and up to conventional commercial concentrations, proportions of acid varying between about 18% to 22% by weight of the resin present may be satisfactorily used.

For the production of cellular resinous products having high mechanical strength, high impact and compressive strengths and suitable for use in such applications as reproduction tools and fixtures in the automotive industry, phenol-aldehyde type resins have been found to be particularly suitable. For this purpose, it has been found desirable, though not necessarily essential, also to incorporate various thinners, wetting agents, plasticizers and fillers in the acid-metal resin.

A great many thinners may be used and, in general, any compatible solvent for the particular resin being expanded is satisfactory. Thinners included within this classification are alcohols such as methyl alcohol, ethyl alcohol, propyl alcohol, and isopropyl alcohol; esters such as butyl acetate and amyl acetate; ketones such as acetone and methyl ethyl ketone. The addition of thinners to phenol-aldehyde resins causes the individual pores or cells of the expanded resin to be somewhat larger and coarser in texture. Proportions of thinners which may be incorporated into the compositions of this invention vary between about 1% and about 10% by weight of the resin. Proportions between about 5% and 10% are for the majority of applications most desirable, and approximately 7½% has been found to be the optimum concentration. Amounts above about 10% cause considerable shrinking after expansion of the resin, and amounts less than about 1% do not alter the viscosity or other characteristics of the resin or of the resulting foamed structure to any appreciable or significant extent.

Wetting agents in proportions between about 1% and about 5% may be used to advantage. Wetting agents such as fatty alcohol sulfates sold under the designations Foamasol and Dupanol WA, give approximately comparable results; sulfonated hydrocarbons such as alkylated naphthalene sulfonic acids sold under the designations Santomerse and Nacconal may likewise be used; the technical grade of alkyl dimethyl benzyl ammonium chloride sold by the Onyx Oil and Chemical Company, New York, N. Y., under the designation Ammonyx T, also may be employed. The wetting agent appears to reduce the size of the pores and to inhibit the tendency of thinners to increase the cell size. The wetting agent also appears to reduce the surface tension and contributes to the formation of uniformly distributed small cells.

With the phenol-aldehyde type resinous mixtures, the addition thereto of a small amount of a plasticizing agent has been found helpful in decreasing the elimination of free carbolic acid during the foaming action, as well as thereafter, and substantially eliminates toxicity of the material to the human skin. Plasticizers which may be used include the polyhydric alcohols and more particularly the glycols, including propylene glycol, ethylene glycol, diethylene glycol, triethylene glycol, and trimethylene glycol. Proportions between about 2½% and 4½% by weight of the resin, serve the above purpose, and where incorporated with the resin before admixture with the other ingredients of the composition, the resin is rendered more stable and may be readily stored for a substantial period of time before use.

For optimum results, the presence of fillers is also desirable. A variety of fillers may be used including metallic oxides, wood cellulose flock, wood flock, solka flock, and rayon flock. The introduction of metallic or elemental iron into the composition in combination with an iron oxide has been found to be desirable. Commercial grades of iron oxide containing about 40% free iron and minor proportions of aluminum oxide, calcium oxide, magnesium oxide and silica are satisfactory. Oxides of the selected metal may similarly accompany the metal and mixtures of oxides may be used. The nonmetallic secondary fillers have an additional effect and appear to increase the impact, tensile, and shear strength and resiliency of the expanded cellular product. Any proportion of secondary filler tends to increase these properties and the proportion which may be suitably incorporated is limited only by the increase in viscosity of the resinous mixture. Additions of secondary fillers in amounts above about 16% by weight of the resin increase the viscosity of the mixture to a puttylike consistency which undesirably retards the formation of foam. Amounts as low as about 3% produce significant and desirable increases in physical properties.

In the presence of thinners, wetting agents, plasticizers, metallic and secondary fillers and phenol-aldehyde type resins, optimum control of the rate of gas evolution and uniformity of cellular structure is attained by the use of a mixture of mineral acids. A preferred admixture of acids is as follows and will hereinafter be designated Solution A:

23% to 28% sulfuric acid, 66° Baumé
25% to 33% hydrochloric acid, 18° Baumé
2% to 7% phosphoric acid (75%).
Balance—water The admixture of the constituent parts of the formulations of this invention may be accomplished in two steps; the resin, the metal, and, if desired, the thinner, plasticizer, wetting agent and filler may be incorporated into one mixture. The aqueous solution of acid or acids form a second ingredient. The combination of the two ingredients by thorough intermixing forms the intermediate product which will expand to form the cellular products of this invention. It will be understood that, if desired, the various ingredients may be admixed one at a time but that substantially comparable results are obtained by the two-step mixing procedure.

The following examples are given to illustrate more completely the method of the invention: The resin used throughout the examples is an aqueous phenol formaldehyde product of partial reaction of phenol and formaldehyde having a specific gravity of about 1.19 to 1.20, and containing between about 75% and 90% resin solids by weight. Aqueous acidic solution refers to the solution designated Solution A.

*Example 1*

100 grams resin
5 grams iron
20 grams aqueous acidic solution.

The aqueous acidic solution and iron were thoroughly admixed with the resin in a container at room temperature. After standing for about one-half to three minutes, the mass foamed, generated heat and set to a cellular product having a volume between about three times its original mass. The acid and metal react to liberate hydrogen and possibly other gaseous products, and the excess acid which is present serves to accelerate the conversion of the resin to a cured or insoluble and infusible state. The final product is a hard, expanded, cellular, resinous mass of low density having some closed and some open pores.

A series of tests were made, maintaining the acid concentration of Example 1 constant and increasing the proportion of iron in 2 gram increments up to as high as 15 grams, and decreasing the proportion to as low as one gram, the increments below three grams being in one-fifth of a gram quantities. Amounts of iron above five grams were observed to increase the quantity of gaseous products formed substantially in proportion to quantity and to thereby produce less dense materials. Proportions of iron as low at 1.2 grams were found to produce foaming and beneficial results.

A further series of tests was made in which the concentration of each of the acids of Solution A were increased and decreased from their concentrations in Solution A. While maintaining the concentration of resin and iron constant, increasing the concentration of acid in general, foaming produced somewhat sooner, and the rate of evolution was somewhat faster. Additionally, each of the acids was used separately and each acid foamed the resinous mixture. With the separate acids, the rate of gas evolution was similarly found to be dependent upon concentration and in general to increase with increased concentration. No advantage was found in using acids in concentrations stronger than commercial concentrations of 18° Bé. to 20° Bé. for hydrochloric acid, 66° Bé. for sulfuric acid, and 75% or 85% for phosphoric acid.

Example 1 may be additionally varied by substituting for the phenol formaldehyde resin, other thermosetting resins of the types including ureas, melamines and polyesters. The substitutive resins are used in liquid form as nearly comparable to the physical form of the phenol formaldehyde resin as can be obtained, and in each instance, the resins can be formed to an extent comparable to that obtained with the phenol formaldehyde resin.

The iron of Example 1 was substituted for by commercially available metals above hydrogen in the electromotive series. Under the same conditions, calcium, magnesium and aluminum were much more reactive and evolved gaseous reaction products at a faster rate than did the iron of Example 1. Zinc, cadmium, cobalt, lead and tin were found to evolve gas at a rate slower than iron. With the slower metals, an increase in concentration of acids was found to produce a desirable gas evolution rate, while a decrease in concentration of acid was found to slow up the gas evolution rate of the more reactive metals.

*Example 2*

100 grams resin
3.5 grams isopropyl alcohol
6 grams iron
20 grams aqueous acidic solution The aqueous acidic solution, iron and isopropyl alcohol were thoroughly admixed with the resin in a manner comparable to that used in Example 1. After standing for a short period, the volume increased to about three times its original volume, set stiff in fourteen minutes and cured to an infusible resin in 1½ hours at 140° F. The cellular product was fine in texture, each pore being relatively small.

A series of tests were made in which the proportion of isopropyl alcohol was increased in 1 gram increments up to 9½ grams. As the amount of isopropyl alcohol increased, the size of the pores likewise increased and the time required for the expanded cellular resin to set up to a rigid, stiff mass was increased. For example, at 1.5 grams, the set-up time was twenty minutes, and at 6.5 grams, the set-up time was in excess of an hour. Other thinners including methyl, ethyl and propyl alcohols, acetone and methyl ethyl ketone gave comparable results when substituted for isopropyl alcohol.

To this series of tests varying amounts of wetting agent were added of the fatty alcohol sulfate type, specifically Foamasol. Amounts of Foamasol above about 1 gram were observed to counteract the tendency of isopropyl alcohol to increase the pore size. This tendency continued to be exerted up to about 5 grams of wetting agent after which further additions promoted an undesirable increase in foaming. Substitution of other wetting agents including Ammonyx T, Santomerse and Naccanol, produced comparable results.

*Example 3*

100 grams resin
7½ grams isopropyl alcohol
5 grams iron
9 grams ferric oxide
1 gram wetting agent (Foamasol)
5 grams rayon flock
20 grams aqueous acidic solution The addition of rayon flock to the oher constituents produced a marked increase in resiliency and mechanical strength of the expanded cellular resin. The cellular structure was uniform in texture and the resiliency of the foam mixture was comparable to soft wood. A nail or screw inserted in the material was readily retained and did not fracture the cellular structure. Samples of expanded resin of this composition were cured in about two hours at 140° F. and others were cured at room temperature in about six to seven hours.

The substitution of rayon flock by other fillers such as metallic oxides, wood, flour, cellulose flock, etc., in comparable proportions was noted to enhance the resiliency of the cellular structure, but to a lesser degree than the rayon flock.

This application is a continuation-in-part of our prior co-pending application, Serial Number 213,292 filed February 28, 1951.

Having thus described the invention, we claim:

1. A method of forming an expanded, cellular, hard, resinous product which comprises admixing 100 parts of a liquid, acid-curable phenol-aldehyde partial reaction product containing about 75% to about 90% resin solids by weight, about 18 to about 22 parts of an aqueous acidic solution, and a metal above hydrogen in the electromotive series in an amount sufficient to produce an amount of gas when reacted with said aqueous acidic solution equivalent to the amount of gas produced when from about 1.2 to about 12 parts of iron is reacted with about 18 to about 22 parts of sulfuric acid having a concentration between 50% 66° Bé. sulfuric acid and 66° Bé. sulfuric acid, the aqueous acidic solution being equivalent in the rate of formation of gas with iron to said sulfuric acid solution.

2. A method of forming an expanded, cellular, hard, resinous product which comprises admixing 100 parts of a liquid acid-curable phenol-formaldehyde partial reaction product containing about 75% to about 90% resin solids by weight, about 18 to about 22 parts of an aqueous acidic solution, and a metal above hydrogen in the electromotive series in an amount sufficient to produce an amount of gas when reacted with said aqueous acidic solution equivalent to the amount of gas produced when from about 1.2 to about 12 parts of iron is reacted with about 18 to about 22 parts of sulfuric acid having a concentration between 50% 66° Bé. sulfuric acid and 66° Bé. sulfuric acid, the aqueous acidic solution being equivalent in the rate of formation of gas with iron to said sulfuric acid solution.

3. A method of forming an expanded, cellular, hard, resinous product which comprises admixing 100 parts of a liquid acid-curable phenol-formaldehyde partial reaction product containing about 75% to about 90% resin solids by weight, about 18 to about 22 parts of an aqueous acidic solution, a metal above hydrogen in the electromotive series in an amount sufficient to produce an amount of gas when reacted with said aqueous acidic solution equivalent to the amount of gas produced when from about 1.2 to about 12 parts of iron is reacted with about 18 to about 22 parts of sulfuric acid having a concentration between 50% 66° Bé. sulfuric acid and 66° Bé. sulfuric acid, the aqueous acidic solution being equivalent in the rate of formation of gas with iron to said sulfuric acid solution, 1–5 parts of a wetting agent, 1–10 parts of a thinner for said resin, and 3–16 parts of a chemical nonreactive filler.

4. A method of forming an expanded, cellular, hard, resinous product which comprises admixing 100 parts of a liquid acid-curable phenol-formaldehyde reaction product containing about 75%–90% resin solids by weight, about 18 to about 22 parts of an aqueous acidic solution, a metal above hydrogen in the electromotive series in an amount sufficient to produce an amount of gas when reacted with said aqueous acidic solution equivalent to the amount of gas produced when from about 1.2 to about 12 parts of iron is reacted with about 18 to about 22 parts of sulfuric acid having a concentration between 50% 66° Bé. sulfuric acid and 66° Bé. sulfuric acid, the aqueous acidic solution being equivalent in the rate of formation of gas with iron to said sulfuric acid solution, 1–5 parts of a fatty alcohol sulfate wetting agent, 1–10 parts of a thinner for said resin and 3–16 parts of a filler selected from the group consisting of metallic oxides, wood flock, solka flock and rayon flock.

5. A method of forming an expanded, cellular, hard, resinous product which comprises admixing 100 parts of a liquid acid-curable phenol-formaldehyde partial reaction product containing about 75–90% resin solids by weight, about 18 to about 22 parts of an aqueous acidic solution consisting of 23%–28% 66° Bé. $H_2SO_4$, 25–33% 18° Bé. HCl, 2%–7% of 75% $H_3PO_4$, a metal above hydrogen in the electromotive series in an amount sufficient to produce an amount of gas when reacted with said aqueous acidic solution equivalent to the amount of gas produced when from about 1.2 to about 12 parts of iron is reacted with about 18 to about 22 parts of sulfuric acid having a concentration between 50% 66° Bé. sulfuric acid and 66° Bé. sulfuric acid, 1–5 parts of a fatty alcohol sulfate wetting agent, 5–10 parts of a thinner for said resin, 2½–4½ parts of a polyhydric alcohol, and 3–16 parts of a filler selected from the group consisting of metallic oxides, wood flock, solka flock and rayon flock.

6. A method of forming an expanded, cellular, hard, resinous product which comprises admixing 100 parts of a liquid acid-curable phenol-formaldehyde partial reaction product containing about 75%–78% resin solids by weight and having a specific gravity of about 1.19, 5 parts iron, 7½ parts isopropyl alcohol, 9 parts ferric oxide, 1 part fatty alcohol sulfate wetting agent, 5 parts rayon flock and 20 parts of an aqueous acidic solution consisting of 23%–28% 66° Bé. $H_2SO_4$, 25%–33% 18° Bé. HCl, 2%–7% of 75% $H_3PO_4$.

(References on following page)

References Cited in the file of this patent

UNITED STATES PATENTS

| | | |
|---|---|---|
| 982,230 | Baekeland | Jan. 24, 1911 |
| 2,394,993 | Gardner | Feb. 19, 1946 |
| 2,446,429 | Nelson et al. | Aug. 3, 1948 |
| 2,561,999 | Stuck | July 24, 1951 |
| 2,582,228 | Brinkema | Jan. 15, 1952 |

FOREIGN PATENTS

| | | |
|---|---|---|
| 571,284 | Great Britain | Aug. 17, 1945 |

OTHER REFERENCES

"The Industrial Chemist" December 1949, pages 566–572, "Low Density Expanded Materials," by L. R. B. Shackleton.